May 21, 1968  A. AMRHEIN ET AL  3,383,908
INSPECTION METHOD AND APPARATUS FOR AUTOMOTIVE CLUTCH DISKS
Filed May 16, 1966  2 Sheets-Sheet 2
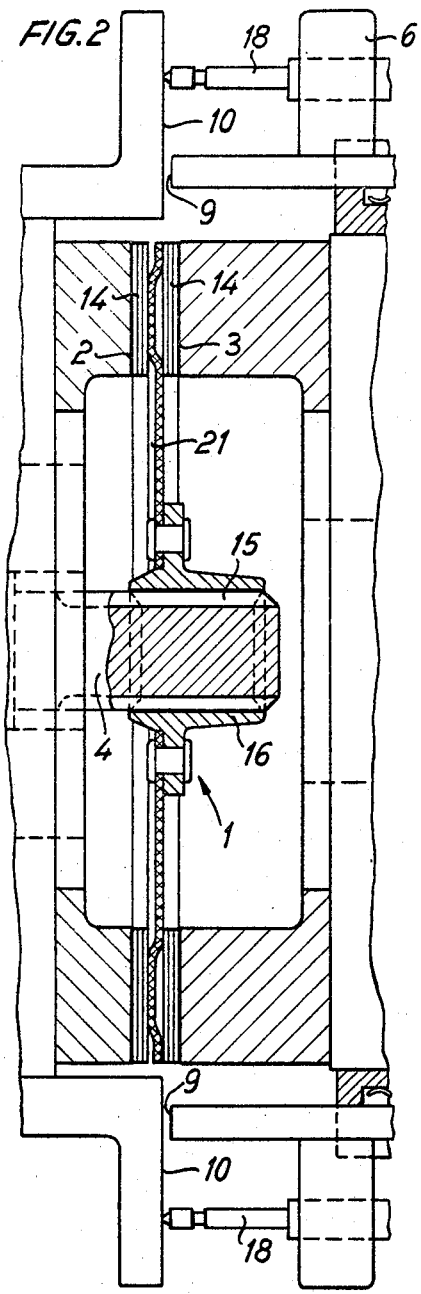
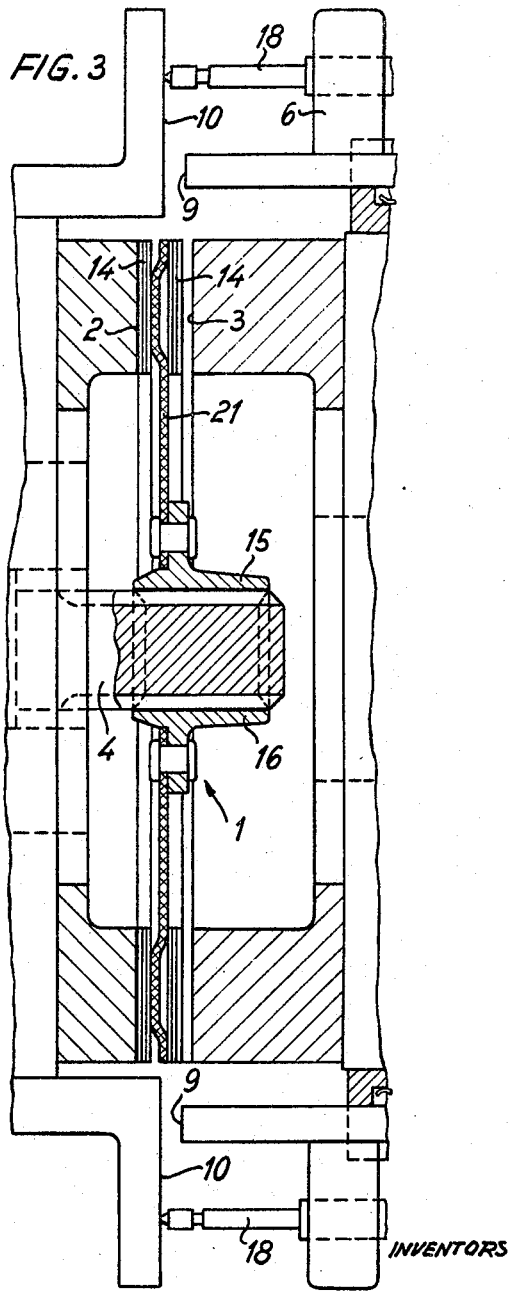
INVENTORS
Adolf Amrhein
Kurt Krines
Erwin Schmidt
By: Low and Berman
Agents United States Patent Office 3,383,908
Patented May 21, 1968

3,383,908
INSPECTION METHOD AND APPARATUS FOR AUTOMOTIVE CLUTCH DISKS
Adolf Amrhein, Fennstr. 38, Kurt Krines, Marsstr. 3, and Erwin Schmidt, Stoesselstr. 24, all of Schweinfurt, Germany
Filed May 16, 1966, Ser. No. 550,320
Claims priority, application Germany, May 19, 1965, F 46,088
6 Claims. (Cl. 73—118)

ABSTRACT OF THE DISCLOSURE

A clutch disc testing mechanism has two pressure platens of which one is provided with a shaft for mounting the tested disk between faces of the platens. Two dial gages on the platens indicate the relative axial position of the platens in two places diametrically spaced from each other relative to the mounting shaft. In operating the mechanism, a disk to be tested is first compressed with the expected working pressure. The pressure is then released to an intermediate value and the resulting axial displacement of the platens is a measure of the resiliency of the facings on the disc. The pressure faces are ultimately moved apart to a final relative axial position in which the force necessary for turning the disc between the pressure faces is measured as a measure of warping of the disc under the working pressure.

---

Figure 1:
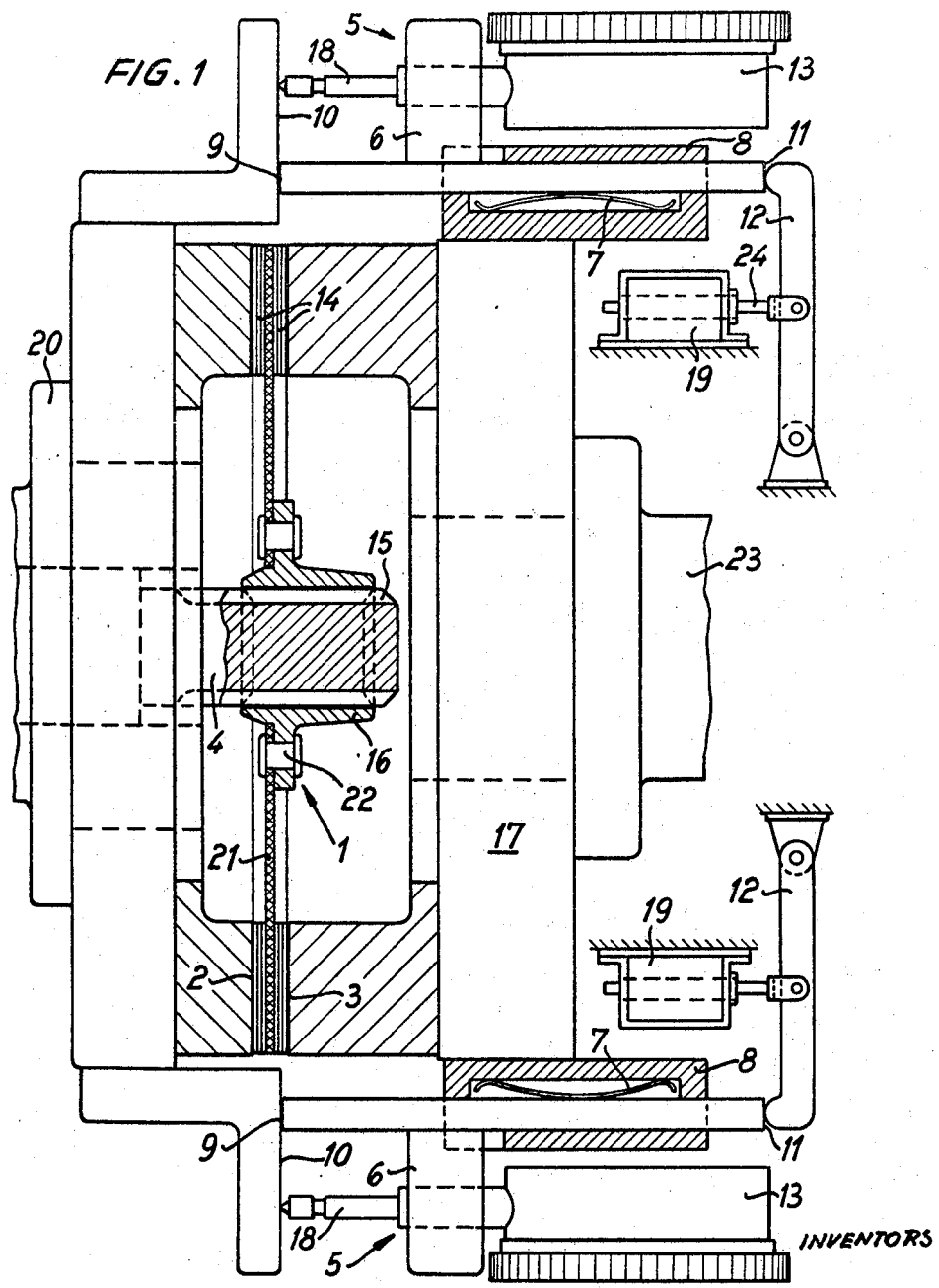

This invention relates to the manufacture of friction clutch disks for automotive vehicles and similar applications, and particularly to the final inspection of the manufactured disks which are commonly employed as the output members in friction clutches.

It has been customary to gage deviation of the peripheral disk portion and of the annular friction facings from a radial reference plane through the hub of the disk, and to reject the disk if the deviation exceeds certain limits.

The known method is relatively complex and time consuming so that the necessary final inspection of the clutch disk accounts for a significant portion of the manufacturing cost. The known method does not lend itself readily to partial or complete automation, and it inherently causes errors because the property measured is not uniquely related to the performance of the disk in actual clutch operation.

An object of the invention is the provision of an inspection method which duplicates actual operating conditions so as to avoid needless rejection of disks which do not meet dimensional requirements when gaged as manufactured, but which readily assume the desired shape during initial operation.

Another object is the provision of an inspection method which is simpler and faster than that employed heretofore.

A further object is the provision of an inspection method that can readily be mechanized at least in part, or which can be entirely automated.

An additional object is the provision of apparatus for performing the method.

With these and other objects in view, as will become apparent hereinafter, the invention, in one of its method aspects, resides in first axially compressing the friction facings of the inspected clutch disk between two pressure members under an applied pressure approximately equal to the intended working pressure to which the disk will be subjected by one or more clutch springs in an engaged clutch. The pressure members assume a certain initial axial position under these conditions.

One of the pressure members is then retracted relative to the other member to a final axial position corresponding to the intended spacing of the pressure rings in the fully released condition of the clutch for which the disk is intended. The force necessary for turning the clutch disk in the final axial position of the pressure members is a reliable indication of the performance to be expected from the clutch disk. If the disk is badly warped, it still frictionally engages both pressure members in their final position, and thus can be turned only with difficulty if at all.

If the disk is equipped with friction facings which are axially resilient, the facings may be inspected for proper resilience in the same operation by initially retracting the movable pressure member to an intermediate position in which the applied axial pressure is reduced to a predetermined value, preferably much smaller than the initially applied working pressure, and by measuring the displacement necessary for thus reducing the pressure. The measured displacement is directly related to the spring characteristics of the friction facings and of their supporting structure.

In one of its apparatus aspects, the invention provides a rotatable holder for the clutch disk to be inspected with mounting means for coaxially securing the disk on the holder against rotation about the holder axis. Two pressure members have respective opposite radial faces which extend in circular arcs about the afore-mentioned axis on opposite sides of a disk secured by the mounting means on the holder, and can be axially moved toward and away from each other. A measuring device is provided for measuring the relative axial position of the two pressure members.

Other features and many of the attendant advantages of this invention will be readily appreciated as the same becomes better understood by reference to the following detailed description of a preferred embodiment when considered with the accompanying drawings in which:

FIG. 1 shows a clutch disk inspecting apparatus of the invention in fragmentary elevational section; and FIGS. 2 and 3 illustrate a portion of the apparatus of FIG. 1 in different operating positions.

Referring initially to FIG. 1, there is seen the fixed platen 20 and the movable platen 17 of a horizontal screw press, not otherwise shown, which have respective opposite annular pressure faces 2, 3. A horizontal shaft 4 is journaled in the fixed platen 20 for rotation about the common axis of the pressure faces 2, 3, and its illustrated free end extends into a chamber enclosed by the two platens in the illustrated position. The other end of the shaft 4, not shown in the drawing, will be understood to carry a handwheel or similar means for turning the shaft 4.

The illustrated end of the shaft 4 is provided with splines 15 for engagement with the hub 16 of a clutch disk 1 which is being inspected. The flange 21 of the disk carries adhesively attached annular friction facings 14 on the periphery of both radial faces, as is conventional and is held to the hub 16 by rivets 22. In the illustrated position of the apparatus, the friction facings 14 and the peripheral portions of the flange 21 are clamped between the faces 2, 3 under a pressure applied by the spindle 23 of the press and indicated by a torque gage, not shown, interposed between the spindle and its handle in the usual manner.

The movable platen 17 carries two identical devices 5 for measuring its axial displacement relative to the fixed platen 20, and the following description will be understood to apply to both devices 5. The platen 17 carries on its periphery a fixed hollow guide 8 in which a slide 6 is axially movable. A leaf spring 7 enclosed in the guide 8 engages the slide 6 to impede its movement relative to the guide.

A dial indicator 13 of conventional construction is fixedly mounted on the slide 6 in such a position that its sensing member or anvil 18 is axially movable and engages a precisely radial abutment face 10 of the fixed platen 20 in all operative positions of the two platens under the pressure of a non-illustrated spring in the indicator.

The slide 6 has end faces 9, 11 of which the face 9 is held in abutting engagement with the face 10 of the platen 20 by a one-armed lever 12 pivotally mounted on the movable portion of the screw press and urged against the end face 11 of the slide 6 by a similarly mounted solenoid 19 whose armature 24 is hingedly attached to the lever 12.

The two measuring devices 5 are offset 180° relative to the axis of the shaft 4.

The afore-described device is operated as follows:

The platen 17 is first retracted sufficiently to permit a disk to be mounted for inspection on the free end of the shaft 4 which serves as a holder for the disk. The disk moves freely in the direction of its axis on the shaft, but is secured by the splines 15 against rotation. The spindle 23 of the press is then turned until its torque gage indicates that the pressure applied to the friction facings 14 by the pressure faces 2, 3 corresponds to the expected working pressure of the clutch for which the disk 1 is intended. The solenoids 19 are briefly energized, and the levers 12 push the indicators 13 on their slides or carriers 6 into the position shown in FIG. 1 in which the end faces 9 of the slides abut against the face 10 of the fixed press platen 20. A reading indicative of the initial relative axial position of the faces 2, 3 can be taken from the hand and dial of the indicator 13, not themselves visible in the drawing.

The press platen 23 is then turned back until its torque gage gives a reading barely high enough to eliminate errors due to friction in the apparatus. This pressure reading may be of the magnitude of one kp and is used on all tested clutch disks of the same type.

The resulting position of the essential operating elements of the apparatus is shown in FIG. 2. The solenoid 19 being deenergized, the slide 6 is held by the spring 7 in a fixed position relative to the movable platen 17, and is retracted with the latter to an intermediate position while the anvil 18 is held in engagement with the face 10 by the indicator spring (not shown). The difference between the reading of the indicator dial at this stage and the initial reading is indicative of the spring characteristics of the clutch facings and of their supporting structure.

As is evident from FIG. 2, the peripheral portion of the flange 21 is resilient, and moves towards its normal relaxed position when the axial pressure of the faces 2, 3 is reduced, thereby moving the friction facings 14 axially apart until their pressure against the platens balances the reduced applied pressure. The dial indicator 13 thus measures the extension of the resilient structure under a predetermined minimal tension and gives a clear indication of the expansion to be expected under zero axial pressure. This also is an important quality criterion in clutch disks of the type discussed.

Ultimately, the spindle 23 is turned until the spacing between the faces 2, 3, reaches a value corresponding to the spacing of the flywheel from the pressure plate in the clutch for which the disk is intended when the clutch is fully released. In this position of the faces 2, 3, the non-illustrated handwheel on the shaft 4 is turned. If the torque required is more than minimal, the clutch disk is rejected. A simi-skilled inspector readily acquires adequate judgment of acceptable or non-acceptable torque since the difference normally is very substantial. Obviously, a torque gage may be employed for critical measurements.

The provision of two diametrically spaced dial indicators 13 and associated devices guards against misalignment in the press and the erroneous readings that may result therefrom. If the two dials do not give readings which are within a very narrow range, adjustment of the apparatus is in order.

The afore-described apparatus can readily be mechanized in an obvious manner to limit the operator's task to the insertion and removal of clutch disks which are being inspected, and the pushing of a button, and the modified apparatus may furnish a light signal indicating whether a disk about to be removed is acceptable or to be rejected. A hydraulic press is preferred for such automatic operation over a screw press, and a controlling pressure gage and a limit switch connected to solenoid valves in the hydraulic press circuit may be employed in a conventional manner to stop movement of the movable platen 17 in the positions shown in FIGS. 1, 2 and 3 respectively.

Electronic gages for measuring distance and torque are commercially available and may replace the dial indicators 13 and the non-illustrated torque gages referred to above. A programming switch, relays, and other circuit elements may connect the various measuring and actuating elements mentioned above into a circuit which causes the press to open the chamber between the platens 17, 20 for removal of an inspected disk and insertion of a new disk, and which furnishes a go/no-go signal indicative of the quality of the inspected disk in a manner conventional in itself. The operator, after changing disks, presses a button to clear the device of the quality signal displayed and to start a new inspection cycle. Although the cycle is very short, one operator may handle more than one apparatus if the same is mechanized in the manner briefly outlined above.

The method and apparatus of the invention are applicable to clutch disks of types different from the disk 1, and specifically to the inspection of disks whose friction facings are fastened by rivets. The results obtained with riveted facings by conventional methods are subject to errors which are avoided by this invention. The application of full working pressure to the disk prior to all measurements sometimes sets the rivets and the friction facings in a clutch disk assembly which would be rejected by conventional gaging methods although it is fully serviceable.

While the invention has been described with particular reference to specific embodiments, it is to be understood that it is not limited thereto, but is to be construed broadly and restricted solely by the scope of the appended claims.

What we claim is:

1. A method of inspecting a clutch disk having an axis, facings directed in opposite axial directions, resiliently movable in said directions, and extending about said axis, which method comprises:
   (a) axially compressing said facings between two pressure members under an applied pressure substantially equal to the intended working pressure of said disk in an engaged clutch, whereby said pressure members assume a first relative axial position;
   (b) axially retracting one of said pressure members relative to the other pressure member to an intermediate relative axial position of said pressure members in which said applied pressure assumes a predetermined value substantially smaller than said working pressure;
   (c) measuring the difference in the axial distances of said pressure members in said first and intermediate positions respectively as a measure of the resiliency of said friction facings;
   (d) further moving said pressure members axially apart to a predetermined final relative axial position; and
   (e) measuring the force necessary for rotating said disk about said axis while said pressure members are in said final relative position thereof as a measure of the warping of said disk under said working pressure.

2. An apparatus for inspecting a clutch disk carrying friction facings comprising, in combination:
   (a) a rotatable holder for the clutch disk to be inspected, said holder having an axis and including mounting means for co-axially securing said disk on said holder against rotation about said axis;
   (b) two pressure members having respective opposite radial faces extending in circular arcs about said axis on opposite axial sides of a disk secured on said holder by said mounting means;
   (c) moving means for moving said faces axially toward and away from each other; and
   (d) measuring means for measuring the relative axial position of said pressure members, said measuring means including
       (1) a carrier mounted on one of said pressure members,
       (2) a sensing member axially movable on said carrier, the other pressure member having an abutment face engageable by said sensing member during relative axial movement of said pressure members, and
       (3) indicator means for indicating the relative movement of said sensing member and of said carrier.

3. An apparatus as set forth in claim 2, further comprising guide means guiding said carrier on said one pressure member for axial movement, and yieldable means impeding said movement of the carrier.

4. An apparatus as set forth in claim 3, further comprising cooperating abutment means on said carrier and on said other pressure member for limiting movement of said carrier toward said other pressure member in a predetermined position of said carrier relative to said other pressure member, and biasing means intermittently operable for urging said carrier into a position of engagement of said abutment means.

5. An apparatus as set forth in claim 4, wherein said biasing means include an electromagnetic actuator.

6. An apparatus for inspecting a clutch disk carrying friction facings comprising, in combination:
   (a) a rotatable holder for the clutch disk to be inspected, said holder having an axis and including mounting means for co-axially securing said disk on said holder against rotation about said axis;
   (b) two pressure members having respective opposite radial faces extending in circular arcs about said axis on opposite axial sides of a disk secured on said holder by said mounting means;
   (c) moving means for moving said faces axially toward and away from each other; and
   (d) measuring means for measuring the relative axial position of said pressure members, said measuring means including
       (1) a carrier mounted on one of said pressure members,
       (2) a sensing member axially movable on said carrier, the other pressure member having an abutment face engageable by said sensing member during relative axial movement of said pressure members, and
       (3) indicator means for indicating the relative movement of said sensing member and of said carrier, said measuring means including two gages angularly offset about said axis, each gage being mounted on one of said pressure members and adapted abuttingly to engage the other pressure member.

References Cited

UNITED STATES PATENTS

| 2,044,067 | 6/1936 | Eldridge et al. | 33—180 |
| 2,044,818 | 6/1936 | Spase | 29—274 X |
| 3,165,926 | 1/1965 | Orr et al. | 73—161 |

RICHARD C. QUEISSER, *Primary Examiner.*

J. W. MYRACLE, *Assistant Examiner.*